April 10, 1928. Re. 16,931

C. B. PRITCHARD

COMBINATION BAND OR TUBE CORRUGATING AND FLANGING MACHINE

Original Filed Nov. 6, 1923 4 Sheets-Sheet 1

Inventor
Carl B. Pritchard
By Winter, Brown & Critchlow
His Attorneys

April 10, 1928. Re. 16,931

C. B. PRITCHARD

COMBINATION BAND OR TUBE CORRUGATING AND FLANGING MACHINE

Original Filed Nov. 6, 1923 4 Sheets-Sheet 2

Witnesses
A. B. Wallace.
C. R. Halbert

Inventor
Carl B. Pritchard
By Winter, Brown & Nicklow
His Attorneys

April 10, 1928. Re. 16,931
C. B. PRITCHARD
COMBINATION BAND OR TUBE CORRUGATING AND FLANGING MACHINE
Original Filed Nov. 6, 1923 4 Sheets-Sheet 3
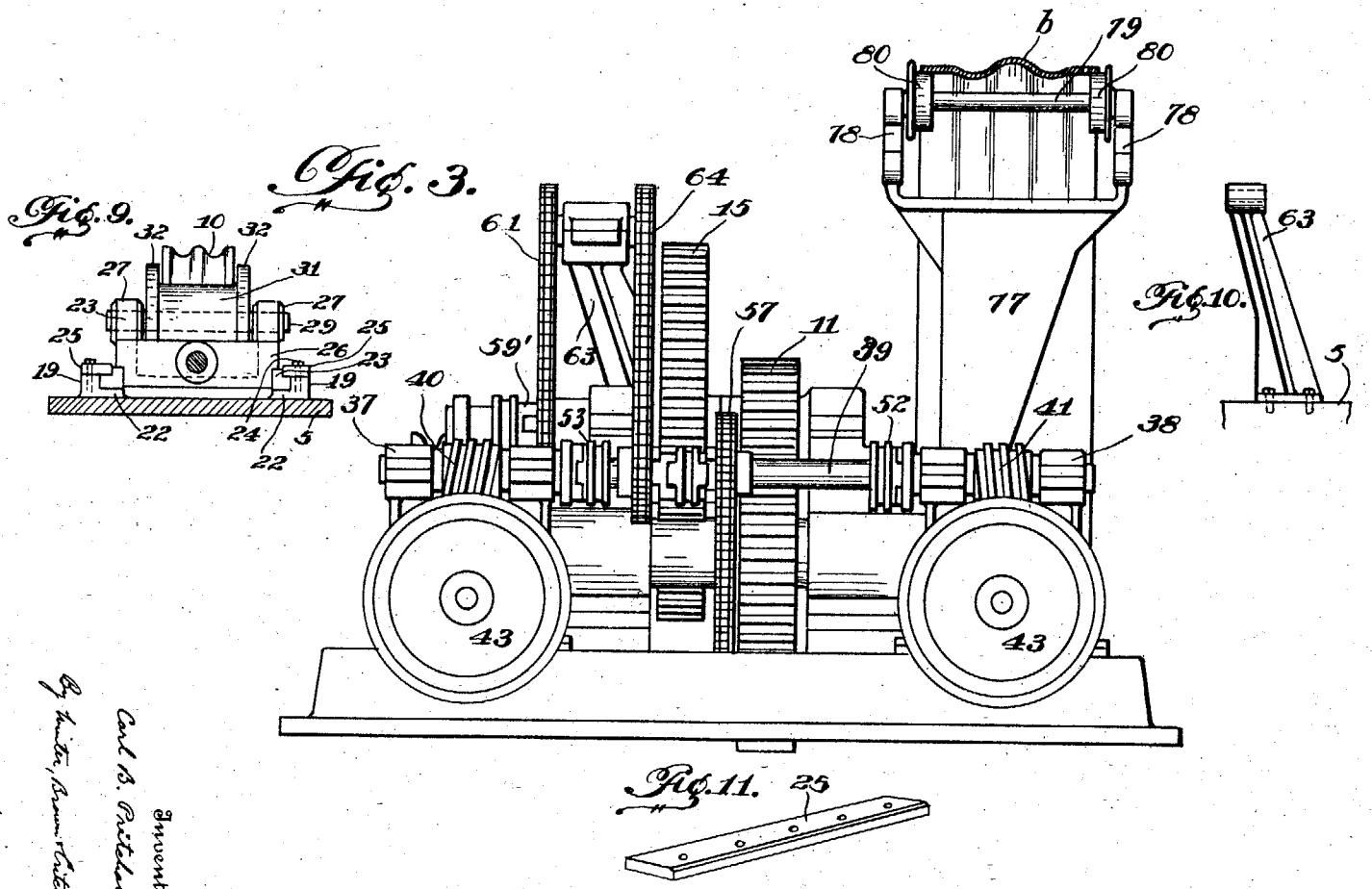
Inventor
Carl B. Pritchard
By Winter, Brown & Critchlow
His Attorneys April 10, 1928. Re. 16,931
C. B. PRITCHARD
COMBINATION BAND OR TUBE CORRUGATING AND FLANGING MACHINE
Original Filed Nov. 6, 1923 4 Sheets-Sheet 4
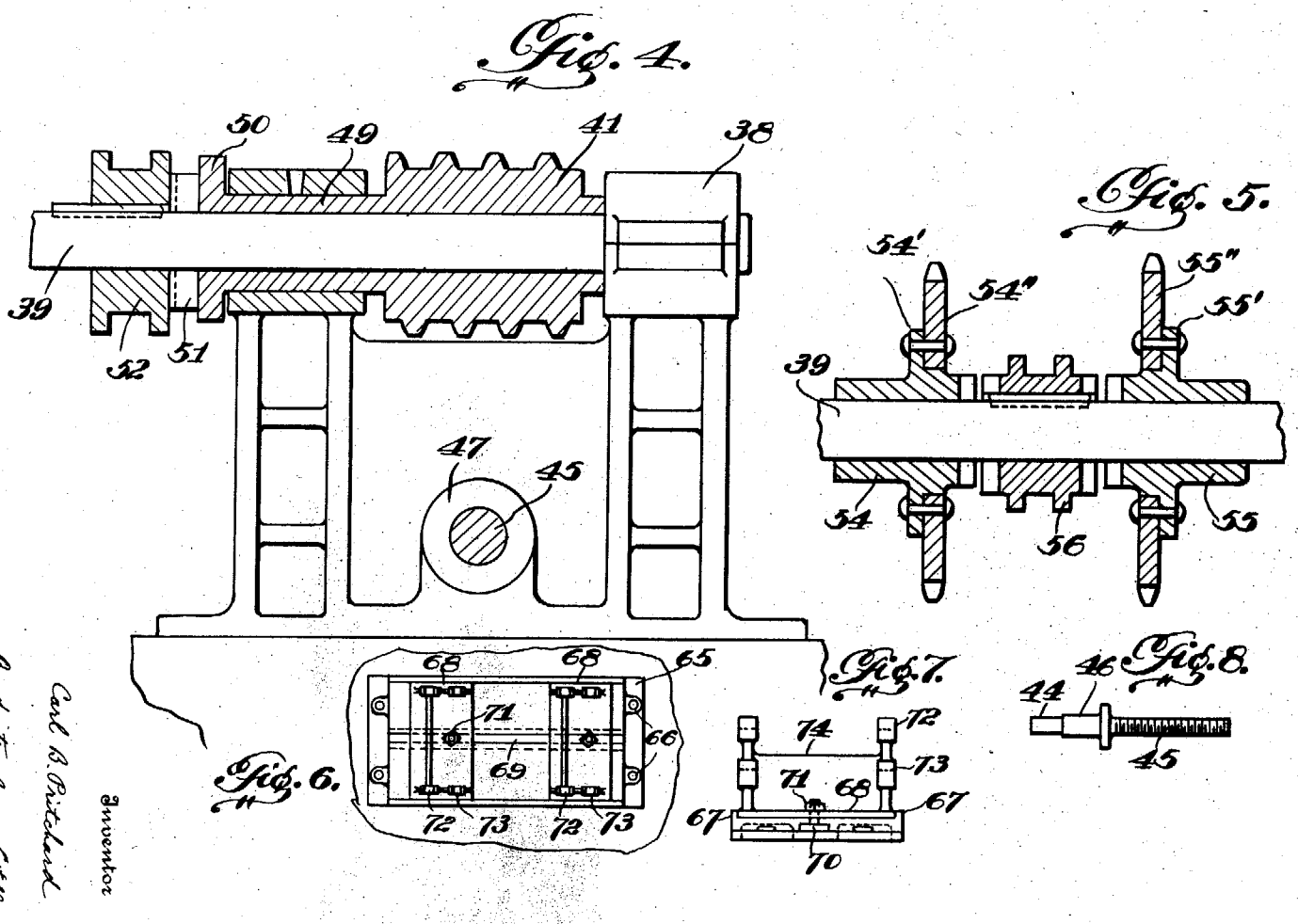
Inventor
Carl B. Pritchard
By Hunter, Brown & Critchlow
His Attorneys Reissued Apr. 10, 1928.

Re. 16,931

UNITED STATES PATENT OFFICE.

CARL B. PRITCHARD, OF SCOTTDALE, PENNSYLVANIA.

COMBINATION BAND OR TUBE CORRUGATING AND FLANGING MACHINE.

Original No. 1,507,424, dated September 2, 1924, Serial No. 673,102, filed November 6, 1923. Application for reissue filed May 8, 1925. Serial No. 28,979.

This invention relates to a combination corrugating and flanging machine whereby pre-formed tubes or bands may be first corrugated and then flanged for providing the rims of bull wheels of well digging or pumping rigs, the primary object of the invention residing in the provision of such a means wherein one tube or band may be corrugated simultaneously with the flanging of a tube or band that has been previously corrugated.

An additional and important object of this invention is to provide the combination corrugating and flanging machine for tubes or bands wherein pre-formed sheet metal tubes or bands of widely varying dimensions and especially the circumferential area thereof may be properly corrugated and then flanged for forming said bull wheel rim.

An additional object of the invention is to provide a machine of the above character wherein the same comprises a pair of driving rolls, one for the corrugating action and the other for the flanging action together with a pair of cooperating forming rolls whereby said forming rolls are slowly fed in a direction toward said driving rolls simultaneously with the rotation of said driving rolls and through the medium of a single power unit.

A still further object of the present invention is to provide a means whereby said forming rolls may be quickly returned to their primary inoperative positions and this without the usual necessity of stopping and then again starting the operation of the machine.

With the above and various objects in view and others that will be apparent as the nature of the invention is better understood, the same comprises the novel form, combination, and arrangement of parts, hereinafter more fully described, shown in the accompanying drawings and claimed.

In the drawings, wherein like reference characters indicate corresponding parts throughout the different views:

Fig. 3 is a rear elevational view of the machine showing but one tube or band, and this in cross section, said tube or band being corrugated.

Figure 2:
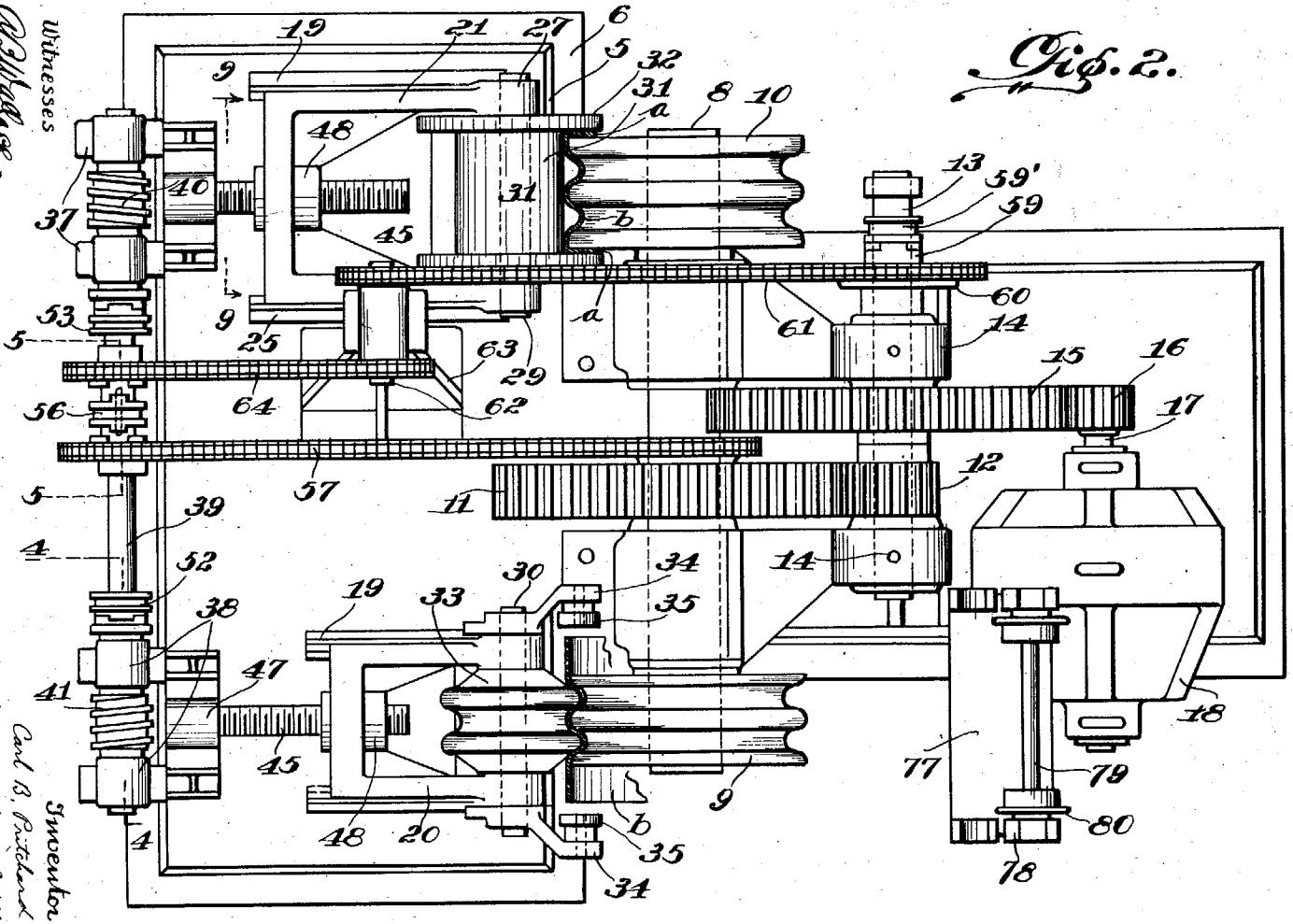
Fig. 2 is a top plan view thereof, the tubes or bands being corrugated and flanged respectively and being fragmentarily shown in cross section.

Fig. 4 is an enlarged fragmentary longitudinal sectional view, taken substantially upon the line 4—4 of Fig. 2, for more clearly disclosing the form of drive mechanism between a horizontal driven shaft at the rear of the machine and the screw shaft operatively connected to the carrier of the forming roll for the corrugating or flanging operation as the case may be, the relatively large worm gear carried by the outer end of said screw shaft for intermesh with the cooperative worm gear carried by said driven shaft being removed.

Fig. 5 is a view similar to Fig. 4, and taken substantially upon the line 5—5 of said Fig. 2 for disclosing the clutch mechanism and sprocket gear formation, said clutch mechanism adapted to be controlled for causing the rotation of said driven shaft in a forward or rearward direction as the case may be for controlling subsequently the slow forward movement of said forming roll or the quick return movement thereof.

Fig. 6 is an enlarged top plan view of a pair of adjustable flanged roller receiving elements employed in conjunction with the present machine, said pair of roller supports being so formed as to support the rollers at different elevations, said rollers adapted at their different elevations to in turn support the band or tube while it is undergoing its corrugating operation, it being necessary in this instance that said pair of roller supporting elements be supported within a well or at a point beneath the level of the machine for purposes to be presently set forth in the following detailed description.

Fig. 7 is an end elevational view of said pair of flanged roller supports.

Fig. 8 is an enlarged elevational view of one of the screw feed shafts operatively connected to said horizontally disposed driven shaft for controlling the slow forward movement or quick returning movement of the forming rolls.

Fig. 9 is an enlarged detailed transverse sectional view, taken substantially upon the line 9—9 of Fig. 2, but showing in rear elevation one of the forming roll carriers as well as its guide means.

Fig. 10 is an end elevational view of a stub shaft supporting standard forming an essential part of the present machine.

Fig. 11 is an enlarged perspective of one of the removable plates that form essential parts of the forming roll carrier guides, and Fig. 12 is an elevational view of one of the plurality of roller carrying shafts employed in conjunction with the present machine.

Figure 1:
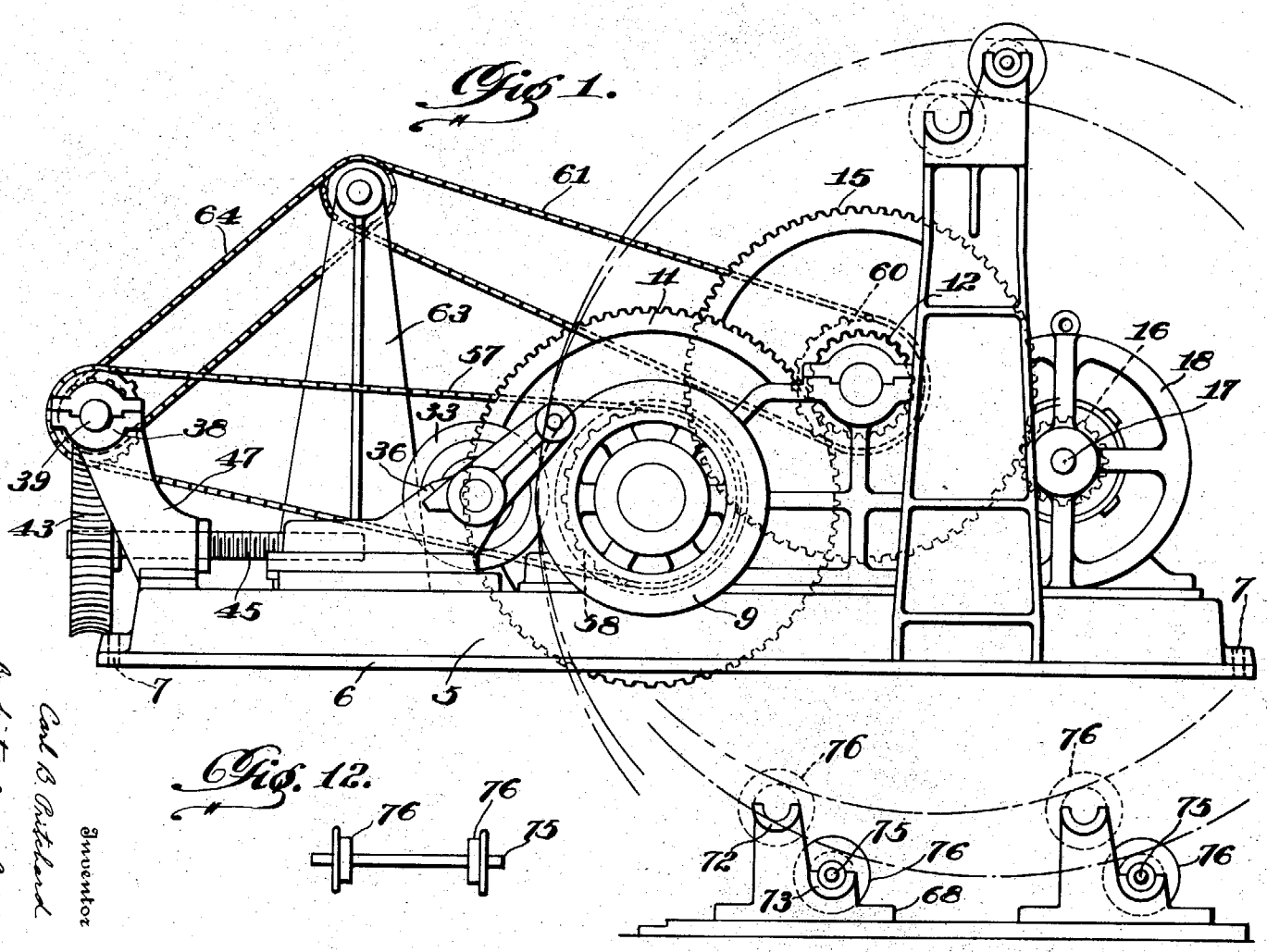
Figure 1 is a side elevational view of a combination tube or band corrugating or flanging machine constructed in accordance with this invention.

Now having particular reference to the drawings, my improved combination tube corrugating and flanging machine comprises among other elements a solid base 5 of relative T-shape as shown clearly in Fig. 2, said base being flanged at 6 entirely around its edges and provided with openings 7, Fig. 1, wherein the same may be anchored to the floor or upon a concrete base or support, of a shape similar to said machine base 5, and of a sufficient height, it being well to state at this time, that should said machine base be anchored to the work shop floor, it will be necessary to provide at opposite sides of the longitudinal portion of the machine base, relatively deep wells or pits for allowing the tubes or bands being corrugated or flanged to extend therein and to be supported during their corrugating operation upon suitable adjustable rollers, which rollers are removably adjustably associated with supports of the type more clearly disclosed in Figs. 6 and 7 to be hereinafter more fully described.

Adjacent the inner end of the longitudinal portion of said relatively T-shaped machine base 5, and suitably journalled adjacent its opposite ends is a transversely extending shaft 8, the opposite ends of which extend beyond the sides of said longitudinal portion of the machine base, and to which are keyed corrugating and flanging driving rollers 9 and 10 respectively. At this time, it might be well to state that I do not wish to be limited to any specific form of corrugating or flanging driving rolls as in the future practice of the invention, any desirable type thereof can be employed that is compatible with the purposes of the present invention.

Keyed to said transverse driving roll carrying shaft and intermediate the ends thereof is a relatively large spur gear 11, that has mesh with a relatively smaller spur gear 12 keyed to a transverse shaft 13 slightly forwardly of said shaft 8 and suitably journalled in spaced bearings 14. Also keyed to said last mentioned shaft 13 and spaced from said relatively small spur gear 12 is a relatively larger spur gear 15 that is in turn in mesh with a small spur gear 16 upon the inner end of the armature shaft 17 of a high powered electric motor 18 that is suitably supported upon the machine base 5 adjacent its front end. It will thus be seen that by the provision of the gear train comprising the gear elements 11, 12, 15 and 16, there will be a substantial reduction in speed between said shaft 17 of the motor 18 and the transverse driving roll carrying shaft 8.

Directly rearwardly of the corrugating and flanging driving rolls 9 and 10 respectively, and upon the transverse portion of the before described machine base 5 are pairs of spaced forming roll carrier guide bars designated generally 19 and longitudinally movable within the respective pairs of which are the corrugating and flanging roll carriers 20 and 21 respectively. The pairs of guide bars 19 as well as the forming roll carriers 20 and 21 are identical in all respects except their dimensions, the pair of guide bars 19 within which is movable the flange forming roll carrier 21 being relatively longer and spaced apart a greater distance than the pair of guide bars 19 for the corrugating roll carrier 20, it being of course understood that said flange forming roll carrier 21 is correspondingly longer and of greater width than the corrugating forming roll carrier 20.

In Fig. 9 wherein there is illustrated in greater detail the spaced guides 19 and carrier 21 complementary to the flange forming roll, it will be noted that said guides 19 are formed integrally by casting or the like with the machine base 5, and that the same are formed at their inner longitudinal edges with channels 22 for providing runways for L-shaped runners 23 of the complementary roll forming carriers 20 and 21 as the case may be.

Detachably secured to the top sides of the guides 19 preferably through the medium of bolts 24 are retaining strips 25, the inner edges of which extend over the protruding edges of said L-shaped runners 23 for consequently preventing any vertical thrust of the respective carrier, and also for allowing the same to be removed from the guides 19 for repair or renewal purposes after said plates 25 have been removed.

The L-shaped runners 23 of each of the forming roll carriers 20 and 21 are integrally connected adjacent their rear ends by a cross web 26, the front end of said runners 23 being formed with vertically extending coaxial shaft bearings 27 within which are rotatable the opposite ends of the flange forming roll carrying shaft 29 and corrugating forming roll carrying shaft 30 respectively. Loose upon the shaft 29 is the flanged forming roll 31 that is of cast steel and terminates at its opposite ends into flanges 32, this roll cooperating with the flange forming driving roll 10 to form inwardly extending flanges *a* upon the opposite ends of the previously corrugated sheet metal band or tube *b* in a manner to be hereinafter more fully described.

Loose upon the shaft 30 of the before-described carrier 20 is a cast steel corrugating forming roll 33 that is of a shape that is necessarily complementary to the shape of a corrugating driving roll 9, and cooperates with said driving roll 9 during the operation of the machine to force certain portions of the before-mentioned band or tube *b* into the grooves of the driving roll 9 as said forming roll 33 moves slowly in a direction thereto for consequently forming corrugations in said band or tube as clearly shown in Figs. 2 and 3, and this in a manner also to be hereinafter more fully described.

Upon the opposite projecting ends of the corrugating forming roll carrying shaft 30 are swingably disposed arms 34, the front ends of which are equipped with removable inwardly projecting guide rollers 35 that engage the opposite edges of the band or tube being corrugated, and this before the corrugating action has started, for consequently maintaining said band or tube in a position to assure the formation of the corrugations at a point directly intermediate the edges of said band or shoe.

The rear ends of the roller carrying arms 34 engage beneath outwardly extending lugs 36 formed upon opposite sides of the forming roll carrier 20, Fig. 1, for limiting the downward swinging movement of said arms as will be obvious.

Journalled at its opposite ends in pairs of spaced and raised bearings 37 and 38 respectively and slightly beyond the rear end of the machine frame 5 is a cross shaft 39 that is equipped adjacent its opposite ends at points within the said bearings with worms 40 and 41 respectively that have mesh with relatively large worm gears 42 and 43 upon the reduced ends 44 of forwardly extending feed screws 45, specifically shown in Fig. 8.

Each of these feed screws 45 includes a plain portion 46 for rotation within a suitable bearing 47, Fig. 2. The threaded portions of said feed screws engage within threaded boxings 48 carried by the connecting webs 26 of the respective forming roll carriers 20 and 21 for manifestly causing forward or rearward sliding movement of said carriers when said cross shaft 39 is rotated in opposite directions.

As more clearly shown in the enlarged detail sectional view in Fig. 4, each of the worms 40 and 41 are loose upon said cross shaft 39 and each is formed with an inwardly extending bearing sleeve 49 that engages through the innermost one of its respective pair of bearings as at 37 or 38, and terminates in a flange 50 formed with suitable clutch teeth 51 for cooperation with a movable clutch element splined upon said shaft 39, the one complementary to the worm 41 being designated 52 while the one complementary to the other of said worms 40 being designated 53, it being manifest that when said shaft 39 is rotated, these clutch elements may be engaged or disengaged with or from the clutch teeth upon the ends of the sleeve 49 of the respective worms 40 or 41 for consequently causing the operation or inoperation as the case may be of the forming rolls 31 and 33.

Loose upon the shaft 39 and at a point slightly off center of said shaft is a pair of clutch collars designated respectively 54 and 55, Fig. 5, the clutch faces of said collars being opposed and adapted to be selectively secured to said shaft 39 by a double-ended complementary clutch element 56 splined to said shaft 39 intermediate the clutch collars 54 and 55. Each of these loosely mounted clutch collars 54 and 55 is formed adjacent its inner end with a circular flange 54′ and 55′ respectively to the inner face of each of which is secured a sprocket gear ring 54″ and 55″ respectively.

Trained over the sprocket gear 55″ is an endless sprocket chain 57 that extends forwardly and is in turn trained over a relatively larger sprocket gear 58, Fig. 1, keyed to the before mentioned transverse shaft 8, upon the opposite ends of which are mounted the driving rolls 9 and 10, it being of course obvious that when the movable clutch element 56 is engaged with the clutch collar 55 and after the clutch elements 52 and 53 have respectively connected the worms 40 and 41 to the shaft 39, the operation of the electric motor 18 will slowly rotate the shaft 39 for consequently slowly feeding the forming rolls 31 and 33 in a direction toward the driving rolls 9 and 10, which, after the unworked upon band or tube and one that has been corrugated have been positioned over the respective driving rolls 9 and 10 and properly supported in a manner to be hereinafter more fully described, said slow feeding movement of the forming rolls will consequently be resultant in the corrugating or flanging of the tubes or bands as the case may be.

One end of the foremost cross shaft 13 is equipped with a clutch member 59, free upon said shaft and being formed with a relatively large sprocket gear 60 over which is trained an endless sprocket chain 61 that extends rearwardly and upwardly and is in turn trained over a relatively smaller sprocket gear upon the inner end of a stub shaft 62, which stub shaft is suitably journalled within the upper end of a vertical post 63, Fig. 10. This post is preferably of the shape shown and is adapted to be secured at its lower end through the medium of bolts or other suitable fastening means to the machine base 5.

The other end of said shaft 62 is equipped with a similar sprocket gear over which is trained a rearwardly and downwardly extending endless sprocket chain 64. This last mentioned sprocket chain 64 is in turn trained over the sprocket ring gear 54″ of the clutch member 54 upon the before described cross shaft 39, and in view of this gearing arrangement it will of course be obvious that by connecting the gear 60 to the foremost cross shaft 13 through the medium of a clutch element 59′ that is splined upon said shaft and adapted for cooperation with the clutch element 59 and a disconnection of the sprocket gear carrying clutch member 55 upon the rearmost cross shaft 39, and a consequent connection of the gear carrying clutch element 54 to said shaft 39 through the medium of the double ended movable clutch member 56, a relatively quick retraction of the forming rolls will be occasioned. In view of the fact that the tubes or bands being acted upon are of such a great circumference as shown by the broken dotted lines in Fig. 1, it will be necessary to provide means for allowing the same to extend beneath the machine base, and in order to accomplish this, it is necessary, as before set forth, to either provide pits or wells at opposite sides of the longitudinal portion of the machine base or to mount the machine a sufficient height above the floor level. In either instance, it is necessary that a supporting and guide means be provided for the tubes or bands to rest upon while undergoing both their corrugating and flanging operations, these supporting and guide means maintaining the bands or tubes being worked upon in proper positions with respect to their driving rolls and for allowing the same to freely rotate when the same are forced into engagement with the driving rolls by the forming rolls due to the frictional contact therebetween, said guiding and supporting means also preventing the tubes from horizontally wobbling which would otherwise cause the corrugations or flanges to be improperly formed.

With particular reference to Figs. 6 and 7 wherein there is detailed one of said guiding and supporting means, 65 designates a substantially rectangular shaped base plate that is flanged at its opposite ends and provided with openings 66 whereby said base plate may be suitably anchored through the medium of bolts or the like to the bottom of its corresponding well or pit or to the machine shop floor. This base plate 65 is formed upon opposite edges with upstanding flanges 67 between which and upon said base plate are adjustable a pair of plates 68, 68. Said base plate 65 is formed centrally with a longitudinal undercut slot 69, within which are movable the heads of bolts 70 that are carried by said last mentioned plates 68, 68, and upon which are to be threaded nuts 71 whereby after said plates have been slid to the proper position upon the base 65, the same may be secured thereto. Each of these adjustable plates 68 is formed at its opposite ends with a pair of integrally joined shaft end rests 72 and 73 respectively, it being noted from a consideration of Figs. 1 and 7 that the rests of each pair are at different elevations and that the pairs of rests at opposite ends of said plates 68 are co-axial with each other. For the purpose of strength, the integrally joined pairs of rests at opposite ends of the plates 68, 68, are integrally joined together by a cross web 74.

For detachable selective positioning at their opposite ends upon either the upper or lower co-axial rests of each plate 68 are cross shafts 75—75, Figs. 1 and 12. Inwardly of the ends of each of these shafts 75 are flanged rollers 76 upon which engage the opposite edges of the tubes or bands being corrugated or flanged, it being of course apparent that when tubes or bands of relatively great circumferential area are being worked upon, these shafts 75—75 will be positioned upon the lowermost rest, and that when tubes or bands of a lesser circumferential area are being worked upon, said shafts will be positioned upon the uppermost rest as more clearly shown by the full and dotted lines of Fig. 1.

The tubes or bands in the original form, that is, before undergoing their corrugating operations are in somewhat of an elliptic formation, and it is therefore necessary in order to obtain the proper corrugating effect to support said tubes or bands from above as well as below, and for accomplishing this, there is provided upon the side of the machine frame adjacent the corrugating forming roll 9, a vertical post or standard 77, that is formed at its upper end and at opposite sides thereof with pairs of co-axial shaft end rests 78, the rests of each pair being also at different elevations, and adapted for the selective reception of a cross shaft 79, that carries adjacent its opposite ends flanged rollers 80, upon which engage the opposite upper edges of the band or tube being corrugated and as more clearly shown in Fig. 3.

In view of the fact that while undergoing their corrugating operations, the bands or tubes assume a true circular shape, it is not necessary to provide a similar support at the opposite side of the machine for supporting the corrugating band or tube being flanged.

In view of the above, it will be at once apparent that the un-worked upon band or tube *b* may be positioned upon the corrugating side of the machine in a manner shown by the dotted lines in Fig. 1, it being of course noted that this band or tube will contact with the driving wheel 9 at its front side and in view of the fact that the same is supported from above and below in such a manner as to firmly engage said driving wheel 9, this band or tube will be rotated after the forming roll 33 has been moved into engagement therewith, and upon its continued movement of this forming roll 33, toward this band, the ribs of the forming wheel will manifestly force certain portions of the band material into the circumferential grooves of the driving wheel 9 for effectively corrugating the same.

After the band has been corrugated, certain of the movable clutch elements are actuated to control the quick reversal of movement of said forming roll 33 after which the machine may be stopped. A new tube or band is placed upon the driving roll 9 while the corrugated band or tube may be properly positioned upon the driving roll 10 for the flanging operation for consequently simultaneously corrugating and flanging a pair of tubes or bands at a single operation.

It will of course be manifest that after the corrugated band or tube has been positioned upon the driving roll 10, the flanges 32 at opposite ends of the forming roll 31 will force the protruding edges of the band or tube inwardly for consequently flanging the same, this flanging operation being produced by the slow movement of the forming wheel 31 toward its complementary driving wheel 10. In this connection it is noted that the structures of the rolls together with their correlation with the means for moving the forming roll toward the driving roll co-act to bring the flanges 32 preliminarily into contact with the protruding edges of the blank and for subsequently assuring movement of the forming roll for forcing the said edges radially inwards to their final form.

It is necessary that the flanged forming roll 31 have a greater movement toward its complementary driving roll 10 than the corrugating forming roll 33 toward its complementary driving roll 9, and it will be necessary for the operator to disconnect the worm 41 from the shaft 39 through the medium of the movable clutch element 52 after the band or tube has been properly corrugated.

After the simultaneous corrugating and flanging operations, the different movable clutch elements are so controlled as to allow for the quick simultaneous return of both of the forming rolls.

It will thus be seen that I have provided a highly useful and efficient machine for corrugating and flanging tubes or bands and this especially while they are in their original cold state, and a machine that will perform said operations simultaneously, and this through the medium of but a single power plant.

I have herein shown and described, a combination corrugating and flanging machine consisting of certain detailed structural elements it being nevertheless understood that I do not wish to limit myself to said detailed structural elements, and in the future practice of the invention these may be changed to suit different demands or occasions without departing from the spirit and scope of the appended claims.

Having thus described my invention, what I claim as new and desire to secure by Letters Patent is:

1. In a corrugating and flanging machine of the character described, a base, corrugating and flanging driving rolls mounted for rotation upon said base, corrugating and flanging forming rolls also mounted upon said base and adapted for respective cooperation with said driving rolls, means for actuating said driving rolls and simultaneously actuated means for controlling the slow movement of said forming rolls in a direction toward said driving rolls, and means for stopping the movement of said forming rolls either jointly or singly.

2. In a corrugating and flanging machine for sheet metal bands, a corrugating and a flanging driving roll, means for rotating said driving rolls simultaneously, a pair of longitudinally movable forming rolls for respective cooperation with said driving rolls, means operable simultaneously with the operation of said driving rolls for moving said forming rolls in a direction toward said driving rolls in a relatively slow manner, and means for causing the quick return of either or both of said forming rolls.

3. In a corrugating and flanging machine, a base, corrugating and flanging driving rolls disposed for rotation upon said base, a pair of longitudinally movable forming rolls slidably disposed upon said base and adapted for respective cooperation with said corrugating and flanging driving rolls, a power plant upon said base, and means operable by said power plant for causing the movement of said forming rolls in a direction toward or away from said driving rolls simultaneously with the operation of said driving rolls.

4. In a corrugating and flanging machine of the character described, a base, corrugating and flanging driving rolls mounted for rotation upon said base, cooperating forming rolls longitudinally slidable upon said base in directions toward or away from their respective driving rolls, a power plant, means for controlling the slow movement of said forming rolls either jointly or singly in a direction toward said driving rolls and simultaneously with the operation of said driving rolls, and means for controlling the quick return of said forming rolls either jointly or singly also during the rotation of said driving rolls.

5. In a corrugating and flanging machine of the character described, a base, a corrugated driving roll disposed for rotation upon said base and over which is to be engaged a corrugated tube of relatively wider dimensions than said driving roll, a forming roll flanged at its opposite ends disposed for sliding movement upon said base in directions toward or away from said driving roll, the flanges of said forming roll adapted for engagement with the protruding edges of the tube being flanged, and means for simultaneously rotating said driving roll and for moving said forming roll slowly in a direction toward said driving roll for consequently forcing the protruding edges of said tube inwardly.

6. In a tube corrugating machine, a base, a corrugated driving roll mounted for rotation upon said base and around which the tube to be corrugated moves, a hanger and a support for the tube being corrugated forwardly of said driving roll, a cooperating forming roll slidably movable in opposite directions upon said base, means simultaneously with the operation of said driving roll for forcing said forming roll into engagement with said driving roll for corrugating said tube, said hanger and support being adjustable to tubes of varying circumferential areas.

7. A machine for forming rims for bull wheels comprising a rotatably mounted driving roll over which is adapted to be engaged a tubular blank of greater width than that of the finished rim, a forming roll having peripheral flanges spaced apart a distance greater than the width of the finished rim, said rolls being mounted for bodily movement relatively to each other during normal operation thereof a sufficient distance to provide an open pass between the rolls, means for rotating the driving roll, and means for moving one of said rolls towards the remaining roll whereby to bring the said peripheral flanges preliminarily into contact with the marginal edges of said tubular blank and for subsequently moving the roll for forcing the said edges radially inwards.

8. A machine for forming rims for bull wheels comprising a rotatably mounted driving roll over which is adapted to be engaged a tubular blank of greater width than the driving roll, a forming roll having peripheral flanges at its opposite ends adapted to embrace the driving roll, said rolls being mounted for bodily movement relatively to each other during normal operation thereof a sufficient distance to provide an open pass between the rolls for the reception of the blank, means for rotating the driving roll, and means for moving one of said rolls towards the remaining roll whereby to bring said peripheral flanges preliminarily into contact with the marginal edges of said tubular blank and for subsequently moving the roll for effecting the bending of the said edges radially inwards.

9. A machine for forming rims for bull wheels comprising a rotatably mounted driving roll over which is adapted to be engaged a tubular blank of greater width than the driving roll with its marginal edges at its opposite ends projecting beyond the driving roll, a forming roll having peripheral flanges at its opposite ends spaced a sufficient distance apart to enable the flanges to straddle the driving roll, said forming roll being mounted for bodily movement relatively to the driving roll during normal operation thereof a sufficient distance to provide an open pass between the rolls for the reception of the blank, means for rotating the driving roll, and means for moving the forming roll towards and from the driving roll, movement of the forming roll towards the driving roll bringing the flanges thereof preliminarily into intimate contact with the marginal edges of the blank and subsequently effecting the spinning of said edges radially inwards.

10. A machine for forming rims for bull wheels comprising a rotatably mounted driving roll around which a tubular blank to be operated upon is adapted to move, a forming roll for coaction with said driving roll, said rolls being mounted for relative bodily movement with respect to each other, means for moving one of said rolls towards and from the remaining roll, and means independent of said rolls for maintaining said tubular blank in a substantially true circular form during treatment by the said rolls, said last named means including a hanger cooperating with the inner surface of the blank and a support coacting with the outer surface of the blank, said hanger being radially adjustable with respect to the axis of the blank operated upon.

CARL B. PRITCHARD.